United States Patent [19]

Lin et al.

[11] 4,316,731

[45] Feb. 23, 1982

[54] METHOD AND APPARATUS FOR PRODUCING FIBERS

[75] Inventors: David C. K. Lin, Newark; Larry J. Huey, Granville, both of Ohio

[73] Assignee: Owens-Corning Fiberglas Corporation, Toledo, Ohio

[21] Appl. No.: 190,677

[22] Filed: Sep. 25, 1980

[51] Int. Cl.³ ............................................. C03B 37/06
[52] U.S. Cl. ................................................ 65/5; 65/16; 264/12; 425/7
[58] Field of Search ................... 65/5, 16; 264/12; 425/7

[56] References Cited

U.S. PATENT DOCUMENTS

| | | | |
|---|---|---|---|
| 2,206,060 | 7/1940 | Slayter | 65/16 X |
| 3,352,653 | 11/1967 | Speth | 65/16 X |
| 3,357,808 | 12/1967 | Eberle | 65/7 |
| 4,150,937 | 4/1979 | Pelagio et al. | 65/16 X |

FOREIGN PATENT DOCUMENTS

371178  5/1973  U.S.S.R. .................... 65/16

Primary Examiner—Robert L. Lindsay, Jr.
Attorney, Agent, or Firm—Ronald C. Hudgens; Philip R. Cloutier; Greg Dziegielewski

[57] ABSTRACT

Method and apparatus are provided for fluidically attenuating streams of material into filaments wherein the blower is designed according to a number of parameters to provide a stream of working fluid at sonic velocity.

16 Claims, 4 Drawing Figures

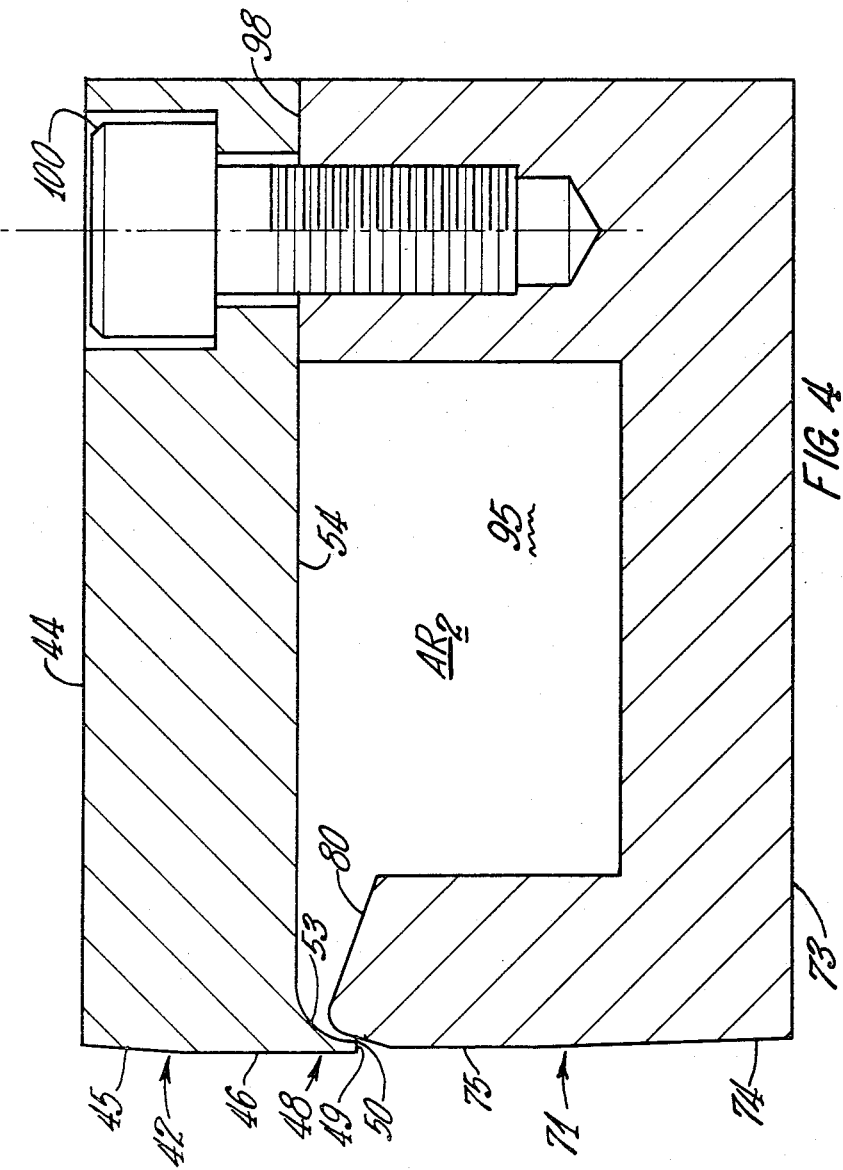

METHOD AND APPARATUS FOR PRODUCING FIBERS

TECHNICAL FIELD

The invention disclosed herein relates to improved process and apparatus for fluidically attenuating streams of molten material into filaments, such as glass filaments.

BACKGROUND ART

In the production of fluidically attenuated glass filaments, the need to improve process efficiency and controllability has been ever present. Particularly important is the need to produce a uniform mass flow having a high attenuative force while minimizing the operating expense of doing so.

There have been a number of attempts to produce such systems. For example, Russian Pat. No. 371,178 discloses the use of a Laval nozzle to attenuate the streams of molten glass into filaments. German Pat. No. 848,990 discloses a system for adjusting the blowers relative to each other to produce maximized operating conditions. U.S. Pat. No. 2,224,466 discloses the use of a skirted blower for the production of staple filaments.

DISCLOSURE OF THE INVENTION

This invention provides method and apparatus for fluidically attenuating streams of material into filaments through the action of fluidic or gaseous blasts. The design of the blower or attenuation means has been set forth in a range of parameters to maximize the efficiency and controllability of the process.

BRIEF DESCRIPTION OF THE DRAWINGS

FIG. 4 is a transverse cross-sectional view of one of the blowers shown in FIG. 1.

BEST MODE OF CARRYING OUT THE INVENTION

Figure 1:
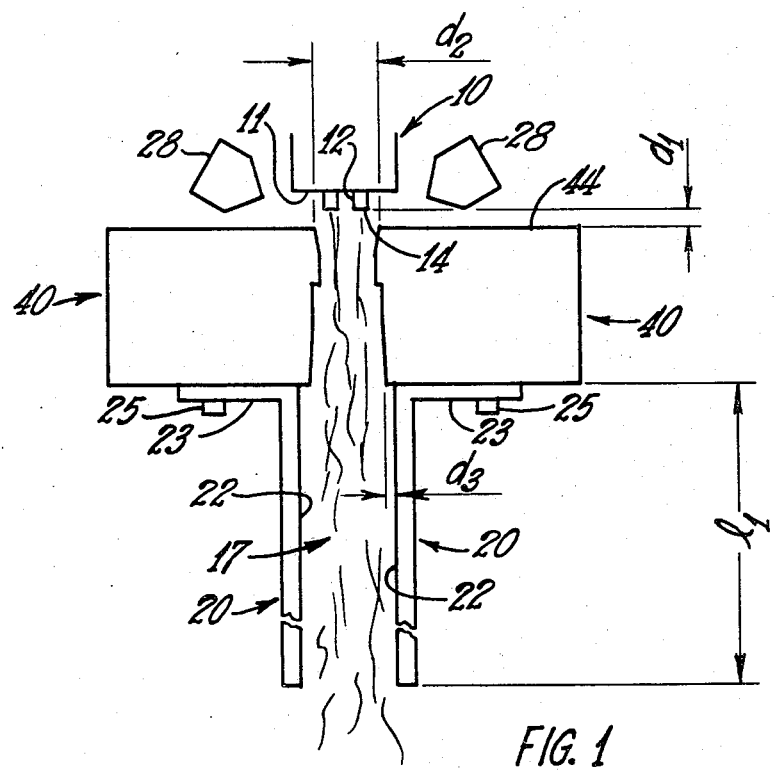
FIG. 1 is a semi-schematic side view of the filament forming system according to the principles of this invention.

As shown in FIG. 1, feeder 10 which has a bottom wall 11 having projections 12 extending therefrom is adapted to supply a stream of molten filament forming material, such as glass, from the distal end 14 of each projection 12. Through the action of a pair of opposed blowers 40, the streams of molten material are attenuated into filaments 17, which then advance along a path 18.

Joined to the bottom of blowers 40 are skirts 20. Each skirt 20 is comprised of a wall 22 and a flange 23 which abuts bottom wall or lower exterior wall 73 of the blower 40. Flange 23 can be joined to wall 73 by conventional means such as screw 25. Preferably, skirt 20 is laterally adjustable along lower exterior wall 73 from flush with the beveled wall 75 to a point recessed a distance $d_3$ therefrom. Preferably, the distance $d_3$ is $\leq 0.125$ inches.

As can be seen in FIG. 1, the blowers 40 are laterally adjustable to optimize the distance $d_2$ as needed. At start-up, however, the distance $d_2$ should be great enough to permit the beads of glass to freely fall between the blowers without striking the surface of the blowers.

For maximized operating efficiency, the upper exterior surface 44 of each of the blowers should be located a distance $d_1$ below the distal ends 14 of projections 12. Preferably, $d_1$ is $\geq 0.125$ inches.

Since blowers 40 emit a stream of high velocity fluid, the fluid at the region between the feeder 10 and blowers 40 is induced to flow inwardly and downwardly therewith.

In some instances, ambient air induced to flow between feeder 10 and blowers 40 is acceptable to produce some forms of fibers. However, it has been found that with the addition of an induced or second fluid supply means 28 associated with each blower 40 adapted to supply a quantity of conditioned fluid between the blower 40 and feeder 10, the characteristics of the resulting product can be modified.

Since such induced fluid is controlled and directed to cool the streams of molten material issuing from the projections 12, supplying a second fluid from supply means 28 at an elevated temperature, that is above ambient, generally alters the heat transfer characteristics of the forming region. For example, heated air or steam characteristics and/or the process efficiency and/or throughput.

For example, by supplying heated air at a temperature of approximately 650° F. at volumes and velocities sufficient to generally supply substantially all of the induced air requirements of the system, finer diameter filaments can be formed than by using ambient air. Similarly, the throughput of the system can also increased.

Similarly, the length $l_1$ of wall 22 can affect the product characteristics. Altering the length $l_1$ can, among other things, change the relative lengths of the staple filaments formed by the system. Even though the system may be operated without skirts 20, it is preferred that the length $l_1$ of wall 22 be within the range from about 6 inches to about 18 inches for the production of staple glass filaments.

Each of the blowers 40 is comprised of a first or upper portion 42 having an upper exterior surface 44 and a front or forward surface 46. Intermediate upper surface 44 and forward surface 46, beveled surface 45 is angled upwardly and inwardly from front surface 46 at an angle "E". To provide the proper flow characteristics of the induced air at the fiber-forming region, angle "E" should fall within the range from about 0° to about 20°. Preferably, angle "E" is within the range from about 5° to about 7°. More specifically, angle "E" should be $\geq 0°$ and $\leq 20°$, and preferably angle "E" should be $\geq 5°$ and $\leq 7°$.

Front surface 46 forms a portion of lip 48 which also includes a base 49 and a nozzle edge 50.

Opposite front surface 46, landing 52 and arcuate surface 53 which is contiguous with landing 52 are adapted to form the upper portion of the nozzle according to the principles of this invention. Chamber surface 54 of first portion 42 is contiguous with arcuate surface 53 and serves to define plenum 95 when first member 42 is joined with lower or second member or portion 71.

Since the fiber-forming systems generally require a long continuous slot for the nozzle thereof, it is important that the thickness $l_2$ of base 49 be sufficient to prevent appreciable bowing or deformation when the high pressure working fluid is supplied to the blower 40. If the lip 48 deforms, the nozzle gap or distance $d_6$ will not be uniform; thereby creating a non-uniform velocity profile over the width of the blower. A non-uniform velocity profile generally tends to produce filaments of different diameters over the width of the blower system.

For the purposes of this invention, the lip length $d_4$ is the distance lip 48 projects from chamber surface 54 of first member 42. That is, it is the vertical distance between the plane containing base 49 and the plane containing chamber surface 54.

For the purposes of this invention, the lip width $d_5$ is the distance between the transition point between arcuate surface 53 and chamber surface 54 and the front surface 46.

For proper design, it is believed that the ratio $R_4$ which is the ratio of the lip length $d_4$ to the lip width $d_5$ should be less than 3. That is, $R_4 = d_4/d_5$, and $R_4 \leq 3$. Preferably, ratio $R_4$ is approximately 1.

Similarly, the ratio $R_5$ which is the ratio of the lip length to the base length $l_2$ of base 49 should be $\leq 30$ and preferably ratio $R_5$ is $\leq 10$. That is, $R_5 = d_4/l_2$, and $R_5 \leq 30$ and preferably $R_5 \leq 10$.

The lower or second member or portion 71 of blower 40 is comprised of a lower exterior or bottom wall 73 and a forward wall 75 having beveled wall 74 therebetween. Beveled wall 74 is contiguous with forward wall 75 and is angled downwardly and inwardly at an angle "F" therefrom.

For proper system performance, it is believed that angle "F" should be $\geq 0°$ and $\leq 3°$, preferably, angle "F" is within the range from about 0° to 1°. That is, angle "F" should be $\geq 0°$ and is $\leq 1°$ in the preferred system.

First arcuate section 77 extends from forward wall 75 and joins head section 78 at the side opposite forward wall 75. Second arcuate section 79 is contiguous with head section 78, and head section 78 is located intermediate first arcuate section 77 and second arcuate section 79. Extending obliquely into the blower, chamber section 80 is contiguous with second arcuate section 79 to further define plenum 95.

A number of relationships are believed to be important to produce an efficient high velocity blower according to the principles of this invention. From FIGS. 2, 3 and 4, it can be seen that head section 78 and chamber section 80 form an angle "G" therebetween. It is believed that angle "G" should fall within the range from about 65° to about 145° with the value of "G" falling between 75° and 105° preferably. That is, angle "G" should be $\geq 65°$ and $\leq 145°$ in the broad sense, and preferably angle "G" should be $\geq 75°$, but $\geq 105°$.

As shown in FIG. 4, the first member 42 and second member 71 are fastened together by means of screws 100. Of course, members 42 and 71 can be fastened together by any suitable means. The width of the nozzle gap $d_6$ is adjusted by adding or removing shims 98 from between members 42 and 71.

When joined together, first member 42 and second member 71 are designed to provide a smoothly or monotonically converging passageway having a point or edge convergence at the end thereof. That is, nozzle edge 50 should be located immediately adjacent head section 78. The gap between edge 50 and head section 78 being equal to the nozzle gap or distance $d_6$.

At the nozzle, landing 52 and head section 78 form an angle "A" therebetween. For proper performance, it is believed that angle "A" should be $\geq 5°$ and $\leq 60°$, with "A" $\geq 10°$ and $\leq 30°$ being preferred. For the purposes of this invention, angle "A" is as the convergence angle.

Figure 2:
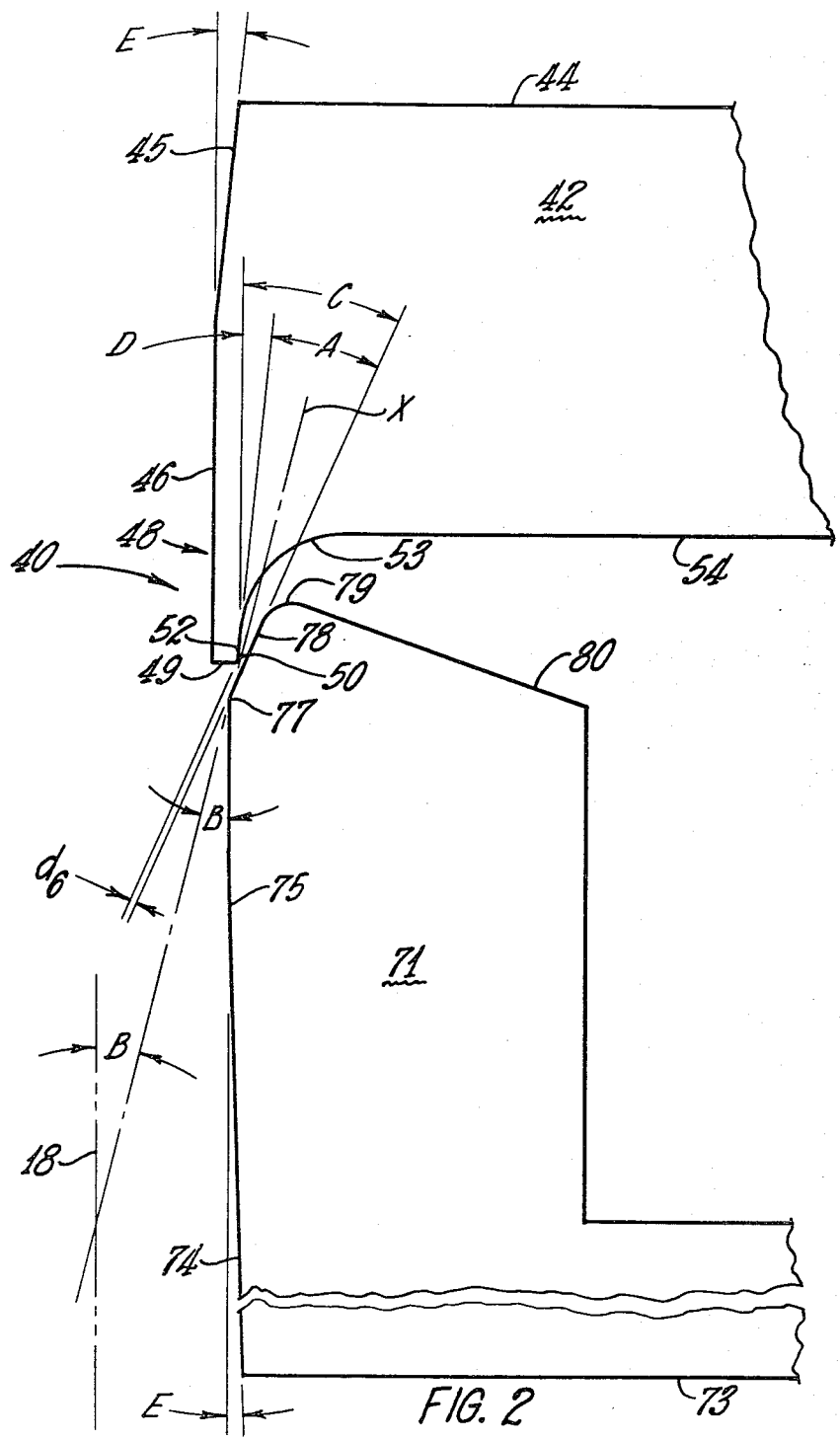
FIG. 2 is an enlarged sectional view of one of the blowers of the system shown in FIG. 1.

As shown in FIG. 2, landing 52 is angled slightly with respect to front surface 46. The angle "D" is formed between a line extending generally parallel to front surface 46 and the plane containing landing 52. As shown in FIG. 2, angle "D" is approximately 5°, and as it can be seen in FIG. 2, an angle "C" is formed between same line generally parallel to front surface 46 and the plane containing head section 78.

As such, angle "A" is the difference between angle "C" and angle "D". As shown in FIG. 2, angle "C" is approximately 25°, thus convergent angle "A" is approximately 20°.

The angle formed between the central line "X" that bisects angle "A" and the path 18 of the filaments is designated as "B". Impingement angle "B", it is believed, should be $\geq 0°$, but $\leq 40°$, with "B" $\geq 10°$ and $\leq 25°$ being preferred. The impingement angle "B" directly affects the amount of attenuative force supplied to the filaments, and thus the efficiency of the operation.

Figure 3:
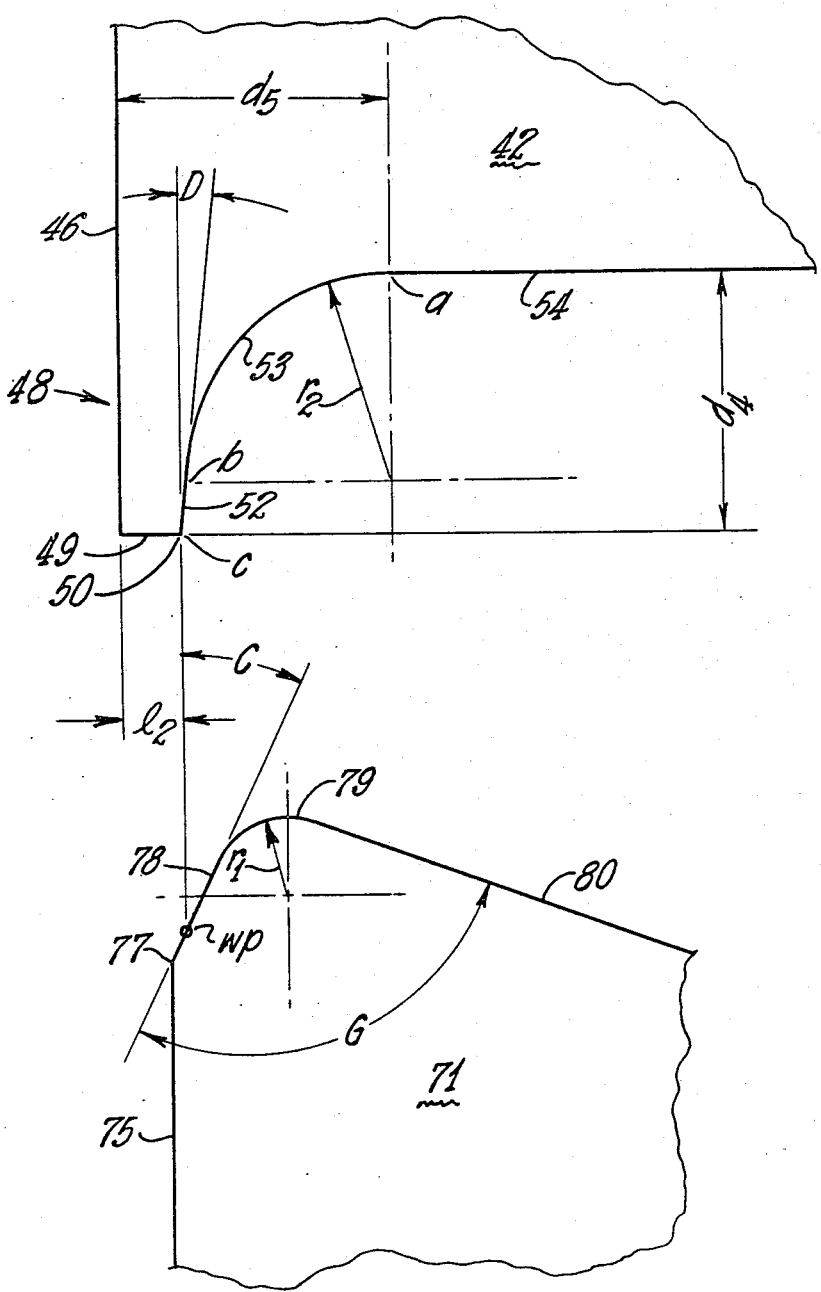
FIG. 3 is an enlarged and exploded view of a portion of the blower shown in FIG. 2.

As can be seen from FIG. 3, arcuate surface 53 has a radius of $r_2$, while arcuate section 79 has a radius of $r_1$.

For proper performance, it is believed that the ratio $R_1$ of radius $r_1$ to gap $d_6$ should be $\geq 3$, with a ratio $R_1 \geq 6$ being preferred. That is, $R_1 = r_1/d_6$, and $R_1 \geq 3$. Preferably $R_1 \geq 6$.

Also, the ratio $R_2$, which is equal to the ratio of radius $r_2$ to the gap $d_6$ should be greater than the ratio $R_1$. That is, $R_2 = r_2/d_6$ and $R_2 \geq R_1$.

The converging section length $l_3$ is equal to the sum of the lengths of the landing 52 and arcuate surfaces 53. It is believed that the ratio $R_3$ which is equal to the ratio of the converging section $l_3$ to the gap $d_6$ should be $\geq 10$ and $\leq 2,000$, with $R_3 \geq 10$ and $\leq 300$ being preferred. That is, $R_3 = l_3/d_6$ and $10 \leq R_3 \leq 2,000$. Preferably $10 \leq R_3 \leq 300$.

Also, it is believed that wherein $A_1$ is equal to the cross-sectional area of the orifice formed between the edge and the head section and $A_2$ is the area of the transverse cross section of the plenum 95 as shown in FIG. 4, the ratio $R_6$ of the area of the plenum to the cross-sectional area of the nozzle orifice shold be $\geq 5$. That is, $R_6 = A_2/A_1$ and $R_6 \geq 5$, and preferably $R_6 \geq 10$.

A blower, according to the principles of this invention, having the following parameters:

Angle A = 20°
Angle B = 15°
Angle C = 25°
Angle D = 5°
Angle E = 5°
Angle F = 1°
Angle G = 96° falling within the aforementioned ratios has provided a highly efficient and highly controllable blower system for producing staple glass fibers.

It is apparent that within the scope of the invention, modifications and different arrangements can be made other than as herein disclosed. The present disclosure is merely illustrative, with the invention comprehending all variations thereof.

INDUSTRIAL APPLICABILITY

The invention described herein is readily applicable to the formation of continuous and/or staple organic and/or inorganic filaments.

We claim:

1. Apparatus for attenuating streams of molten material into filaments advancing along a path comprising:
a first member having:
  (a) a landing,
  (b) an arcuate surface having a radius "$r_2$", the sum of the lengths of the landing and the arcuate surface being equal to the converging section length, $l_3$,
  (c) a front surface opposite said arcuate surface,
  (d) a chamber surface, said arcuate surface being located intermediate and contiguous with said landing and said chamber surface,
  (e) a nozzle edge at the distal end of said landing, and
  (f) a beveled section angled upwardly from said front surface at an angle E; and
a second member having:
  (a) a forward wall,
  (b) a first arcuate section,
  (c) a head section,
  (d) a second arcuate section having a radius "$r_1$", and
  (e) a chamber section,
said first arcuate surface being located intermediate and contiguous with said forward wall and said head section, said second arcuate surface being located intermediate and contiguous with said head section and said chamber section, said first member and said second member being oriented such that (i) said landing and said head sections form an acute angle A therebetween, (ii) said edge being located immediately adjacent said head section to form a nozzle gap $d_6$ therebetween, and (iii) said chamber section and said head section are oriented at an angle G therebetween where $$5° \leq A \leq 60°$$

$$0° \leq E \leq 20°$$

$$65° \leq G \leq 145°$$

wherein the ratio $$R_1 = r_1/d_6$$

and $$R_1 \geq 3$$

wherein the ratio $$R_2 = r_2/d_6$$

and $$R_2 > R_1$$

wherein the ratio $$R_3 = l_3 d_6$$

and $$10 \leq R_3 \leq 2,000.$$

2. The apparatus of claim 1 wherein said second member has beveled wall extending downwardly and rearwardly from said forward wall at an angle F and $$0° \leq F \leq 3°.$$

3. The apparatus of claim 1 wherein $$10° \leq A \leq 30°.$$

4. The apparatus of claim 1 wherein $$5° \leq E \leq 7°.$$

5. The apparatus of claim 1 wherein $$75° \leq G \leq 105°.$$

6. The apparatus of claim 1 wherein the first member and second member are oriented with respect to the path of the advancing filaments such that a line located to bisect angle A forms an angle B with respect to the path of the advancing filaments, wherein $$0° \leq B \leq 40°.$$

7. The apparatus of claim 6 wherein $$10° \leq B \leq 25°.$$

8. The apparatus of claims 1, 2, 4 or 7 further comprising a skirt depending from said second section a length, $l_1$;
wherein $l_1 \geq 6$ inches.

9. The apparatus of claim 8 wherein $l_1 \leq 12$ inches.

10. The apparatus of claim 1 wherein $$R_1 \geq 6.$$

11. The apparatus of claim 1 wherein $$10 \leq R_3 \leq 300.$$

12. The apparatus of claim 1 wherein $A_1$ is equal to the cross-sectional area of the orifice formed between said edge and said head section and $A_2$ is the area of the transverse cross-section of the plenum formed by the first and second portions wherein the ratio $$R_6 = A_2/A_1$$

and $R_6 \geq 5$.

13. The method of forming glass filaments comprising:
providing a feeder means for supplying a plurality of stream of molten glass;
providing an alternative means for fluidically attenuating said streams into filaments comprising: a first member having:
  (a) a landing,
  (b) an arcuate surface having a radius "$r_2$", the sum of the lengths of the landing and the arcuate surface being equal to the converging section length, $l_3$,
  (c) a front surface opposite said arcuate surface,
  (d) a chamber surface, said arcuate surface being located intermediate and contiguous with said landing and said chamber surface,
  (e) a nozzle edge at the distal end of said landing, and
  (f) a beveled section angled upwardly from said front surface at an angle E; and
a second member having:
  (a) a forward wall,
  (b) a first arcuate section,
  (c) a head section,
  (d) a second arcuate section having a radius "$r_1$", and
  (e) a chamber section,
said first arcuate surface being located intermediate and contiguous with said forward wall and said head section, said second arcuate surface being located intermediate and contiguous with said head section and said chamber section, said first member and said second member being oriented such that (i) said landing and said head sections form an acute angle A therebetween, (ii) said edge being located immediately adjacent said head section to form a nozzle gap $d_6$ therebetween, and
(iii) said chamber section and said head section are oriented at an angle G therebetween wherein $$5° \leq A \leq 60°$$

$$0° \leq E \leq 20°$$

$$65° \leq G \leq 145°$$

wherein the ratio $$R_1 = r_1/d_6$$

and $$R_1 \geq 3$$

wherein the ratio $$R_2 = r_2/d_6$$

and $$R_2 > R_1$$

wherein the ratio $$R_3 = l_3/d_6$$

and $$10 \leq R_3 \leq 2,000.$$

14. The method of claim 13 further comprising: providing a conditioned, second fluid to the region between the feeder means and attenuation means to modify the filament attenuation zone.

15. The method of claim 14 wherein said second fluid is at a temperature within the range from about 100° F. (37.8° C.) to about 1200° F. (649° C.).

16. The method of claim 13 wherein said feeder means has a plurality of projections depending therefrom, each of said projections having a distal end wherein said first member has an upper exterior surface, said upper exterior surface being located in a plane below the distal end of said projections.

* * * * *

UNITED STATES PATENT AND TRADEMARK OFFICE
CERTIFICATE OF CORRECTION

PATENT NO. : 4,316,731
DATED : February 23, 1982
INVENTOR(S) : David C. K. Lin and Larry J. Huey It is certified that error appears in the above—identified patent and that said Letters Patent is hereby corrected as shown below:

In Column 2, line 24, sentence should read:

"For example, heated air or steam having a temperature within the range from about 100°F to about 1200°F can be employed to modify the product characteristics and/or the process efficiency and/or throughput".

Signed and Sealed this

Twentieth Day of July 1982

[SEAL]

*Attest:*

GERALD J. MOSSINGHOFF

*Attesting Officer*  *Commissioner of Patents and Trademarks*